(12) United States Patent
Lee et al.

(10) Patent No.: US 8,553,169 B2
(45) Date of Patent: Oct. 8, 2013

(54) DISPLAY DEVICE AND METHOD OF ASSEMBLING THE SAME

(75) Inventors: Ah-Ram Lee, Jeonju-si (KR); Jae-Lok Cha, Goyang-si (KR); Wal-Hee Kim, Yongin-si (KR)

(73) Assignee: Samsung Display Co., Ltd. (KR)

( * ) Notice: Subject to any disclaimer, the term of this patent is extended or adjusted under 35 U.S.C. 154(b) by 279 days.

(21) Appl. No.: 12/204,031

(22) Filed: Sep. 4, 2008

(65) Prior Publication Data

US 2009/0153766 A1    Jun. 18, 2009

(30) Foreign Application Priority Data

Dec. 13, 2007    (KR) .................. 10-2007-0130074

(51) Int. Cl.
*G02F 1/1333*    (2006.01)
*H01J 9/24*    (2006.01)

(52) U.S. Cl.
USPC .............................................. 349/58; 445/24

(58) Field of Classification Search
USPC .............................................. 349/58; 445/24
See application file for complete search history.

(56) References Cited

U.S. PATENT DOCUMENTS

| | | | | |
|---|---|---|---|---|
| 2002/0171784 | A1* | 11/2002 | Choi et al. | 349/58 |
| 2006/0103775 | A1* | 5/2006 | Chung | 349/58 |
| 2007/0132905 | A1* | 6/2007 | Kim et al. | 349/58 |
| 2008/0094536 | A1* | 4/2008 | Kim | 349/58 |

FOREIGN PATENT DOCUMENTS

| | | |
|---|---|---|
| JP | 2003121816 | 4/2003 |
| KR | 1020060078676 | 7/2006 |
| KR | 1020070076902 | 7/2007 |
| KR | 1020070078009 | 7/2007 |

* cited by examiner

*Primary Examiner* — Mark Robinson
*Assistant Examiner* — Jerry Blevins
(74) *Attorney, Agent, or Firm* — Cantor Colburn LLP

(57) ABSTRACT

A display device includes a display panel having an upper surface and being configured to display an image, a mold frame configured to receive the display panel, and a lower receiving member having an inner wall disposed on a peripheral area thereof and being configured to receive mold frame and the display panel. The mold frame includes a peripheral area disposed around an open portion of the mold frame, and a side wall disposed in the peripheral area. The side wall of the mold frame is connected to the inner wall of the lower receiving member, and the panel supporter of the mold frame is disposed on the upper surface of the display panel to support the display panel.

17 Claims, 8 Drawing Sheets ue to their larger size and reduced portability in comparison with LCD devices. # DISPLAY DEVICE AND METHOD OF ASSEMBLING THE SAME This application claims priority to Korean Patent Application No. 2007-0130074, filed on Dec. 13, 2007, and all the benefits accruing therefrom under 35 U.S.C. §119, the contents of which in its entirety are herein incorporated by reference.

BACKGROUND OF THE INVENTION

1. Field of the Invention

The present invention relates to a display device which includes a mold frame, and a method of assembling the display device.

2. Description of the Related Art

The advent of an information society has led to an increasing importance of liquid crystal display ("LCD") devices. Despite having some advantages with respect to price and performance, for example, cathode ray tubes ("CRTs"), which have historically been used in various display devices, are becoming more and more unpopular due to their larger size and reduced portability in comparison with LCD devices. Specifically, the LCD devices are gaining popularity due advantages such as compact size, light weight and low power consumption, for example, as compared to CRTs. As a result, the LCD devices are considered as an increasingly attractive alternative to the CRTs.

In general, the LCD device includes an LCD panel for displaying images, a driver for driving the LCD panel, a backlight unit for illuminating the LCD panel, and a chassis unit for receiving and fixing the abovementioned components therein.

In a process of assembling the LCD device, the backlight unit is received in a lower receiving member and is covered with a mold frame, and then the LCD panel is mounted to the mold frame. An attaching member is disposed between the mold frame and the LCD panel to fix the LCD panel to the mold frame. A top chassis is then combined with the lower receiving member to fix the LCD panel therebetween.

Recently, LCD devices have been assembled without the top chassis to make the LCD devices thinner and lighter. Not providing the top chassis in the LCD device, however, causes the LCD panel to separate from the mold frame, since the LCD panel is not sufficiently fixed to the mold frame by the attaching member alone.

BRIEF SUMMARY OF THE INVENTION

An exemplary embodiment of the present invention provides a display device which does not include a top chassis, thereby effectively reducing a thickness thereof, while still preventing a display panel of the display device from coming off of a mold frame, and a method of assembling the display device.

In an exemplary embodiment of the present invention, a display device includes a display panel having an upper surface and configured to display an image, a mold frame configured to receive the display panel, and a lower receiving member having an inner wall disposed on a peripheral area thereof and configured to receive the mold frame and the display panel. The mold frame includes a peripheral area disposed around an open portion of the mold frame, a side wall disposed in the peripheral area, and a display panel supporter extending from the side wall toward the open portion of the mold frame. The side wall of the mold frame is connected to the inner wall of the lower receiving member, and the panel supporter of the mold frame is disposed on the upper surface of the display panel to support the display panel.

A thickness of the side wall is one of a uniform thickness and a non-uniform thickness. The non-uniform thickness decreases as the side wall extends away from the peripheral area toward the open portion of the mold frame.

The mold frame may further include a protrusion extending from the side wall away from the open portion of the mold frame, the inner wall of the lower receiving member may include a fixing aperture, and the protrusion of the mold frame may be inserted into the fixing aperture of the inner wall of the lower receiving member.

The display device may further include a light source disposed between the mold frame and the lower receiving member, and the mold frame may further include a light leakage prevention portion disposed above the light source on a portion of the peripheral area of the mold frame.

The mold frame may further include an extending portion which extends from the side wall away from the open portion of the mold frame and is disposed on an upper peripheral surface of the lower receiving member.

The display device may further include a backlight unit disposed between the lower receiving unit and the display panel and including a light source configured to generate light and a light guide plate disposed on the light source to direct the light from the light source to the display panel.

The light source includes one of a cold cathode fluorescent lamp and a hot cathode fluorescent lamp.

The backlight unit further includes at least one optical sheet configured to receive the light generated by the light source, and the optical sheet may include at least one of a protective sheet, a prism sheet and a diffusion sheet.

The display device may further include a reflective sheet disposed on the light guide plate to reflect the light to the light guide plate.

The display device may further include an attaching sheet disposed between the display panel and the optical sheet to attach the display panel and the optical sheet.

The light source includes a light source substrate on which a light emitting diode is disposed.

The display device may further include an attaching sheet disposed between the light source substrate and the display panel to attach the light source substrate to the display panel.

The display device may further include a driver configured to drive the display panel and a circuit board disposed above the light source on a peripheral side of the display panel to transmit a driving signal to the driver.

The mold frame may further include a hook extending from the side wall away from the open portion of the mold frame, the inner wall of the lower receiving member may include a connection aperture, and the hook of the mold frame may be inserted into the connection aperture.

An alternative exemplary embodiment of the present invention provides a method of assembling a display device. The method includes disposing a display panel in a mold frame, disposing a light guide plate on the display panel, disposing a light source proximate to a side of the light guide plate, and combining the mold frame with the lower receiving member. The mold frame includes a peripheral area disposed around an open portion of the mold frame, a side wall disposed in the peripheral area, a display panel supporter extending from the side wall toward the open portion of the mold frame, and an extending portion which extends outwardly from the side wall away from the open portion of the mold frame to be disposed on an upper peripheral surface of a lower receiving member configured to receive the mold frame.

The method may further include, after said disposing the display panel in the mold frame, disposing an optical sheet between the display panel and the light guide plate. The optical sheet includes at least one of a protective sheet, a prism sheet and a diffusion sheet.

The method may further include, before said placing the optical sheet, disposing an attaching member on a periphery of the display panel facing the lower receiving panel, and attaching the attaching member to the optical sheet.

Said disposing the optical sheet includes inserting a protrusion disposed on the optical sheet into a corresponding fixing aperture disposed in the side wall of the mold frame.

The method may further include, after said disposing the display panel in the mold frame, disposing an attaching member on a periphery of the display panel facing the lower receiving panel, attaching the attaching member to the light guide plate, and attaching the attaching member to the light source.

Said combining the mold frame with the lower receiving member includes inserting a hook which protrudes from the side wall of the mold frame into a connection aperture disposed in the lower receiving member.

BRIEF DESCRIPTION OF THE DRAWINGS

The above and other aspects, features and advantages of the present invention will become more readily apparent by describing in further detail exemplary embodiments thereof with reference to the accompanying drawings, in which.

DETAILED DESCRIPTION OF THE INVENTION

Figure 1:
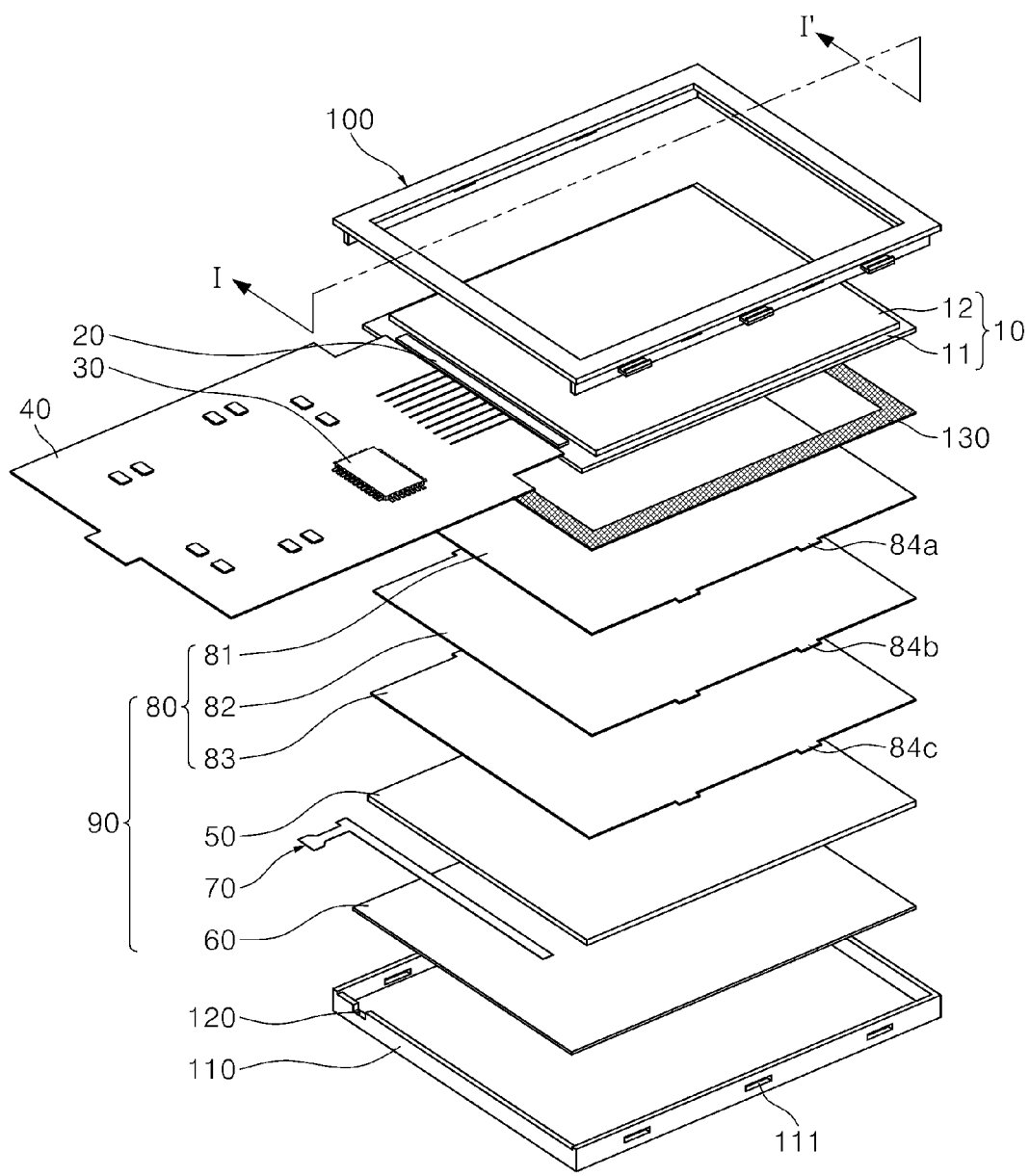
FIG. 1 is an exploded perspective view of a liquid crystal display ("LCD") device according to an exemplary embodiment of the present invention.

The invention will now be described more fully hereinafter with reference to the accompanying drawings, in which embodiments of the invention are shown. The present invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including," when used in this specification, specify the presence of stated features, regions, integers, steps, operations, elements and/or components, but do not preclude the presence or addition of one or more other features, regions, integers, steps, operations, elements, components and/or groups thereof.

Furthermore, relative terms, such as "lower" or "bottom" and "upper" or "top" may be used herein to describe one element's relationship to other elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on the "upper" side of the other elements. The exemplary term "lower" can, therefore, encompass both an orientation of "lower" and "upper," depending upon the particular orientation of the figure. Similarly, if the device in one of the figures were turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning which is consistent with their meaning in the context of the relevant art and the present disclosure, and will not be interpreted in an idealized or overly formal sense unless expressly so defined herein.

Exemplary embodiments of the present invention are described herein with reference to cross section illustrations which are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes which result, for example, from manufacturing. For example, a region illustrated or described as flat may, typically, have rough and/or nonlinear features. Moreover, sharp angles which are illustrated may be rounded. Thus, the regions illustrated in the figures are schematic in nature and their shapes are not intended to illustrate the precise shape of a region and are not intended to limit the scope of the present invention.

Hereinafter, exemplary embodiments of the present invention will be described in further detail with reference to the accompanying drawings.

Figure 2A:
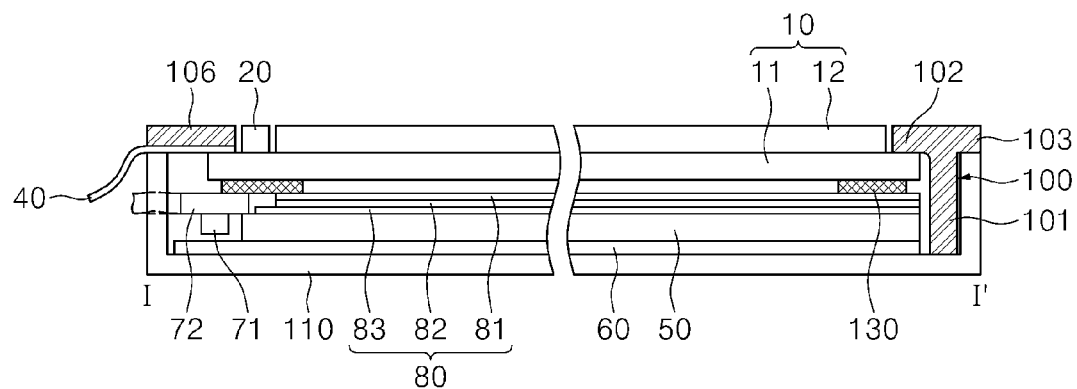
FIGS. 2A and 2B are cross-sectional views taken along line I-I' of FIG. 1.
Figure 2B:
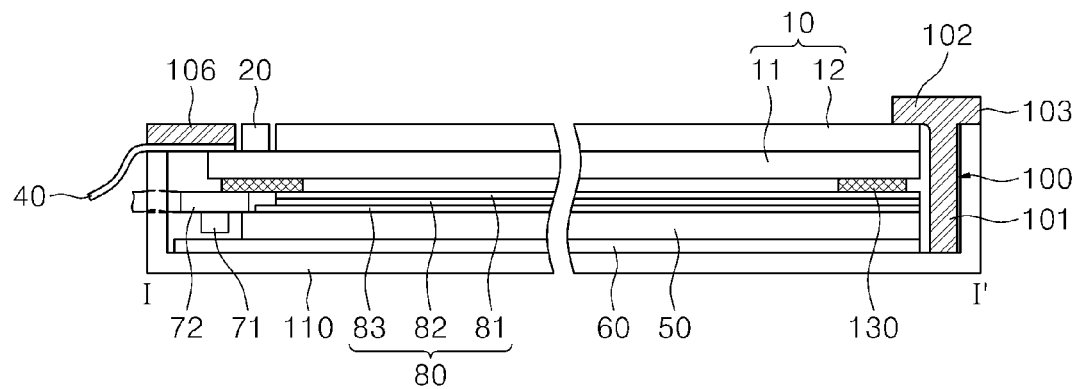
Figure 3:
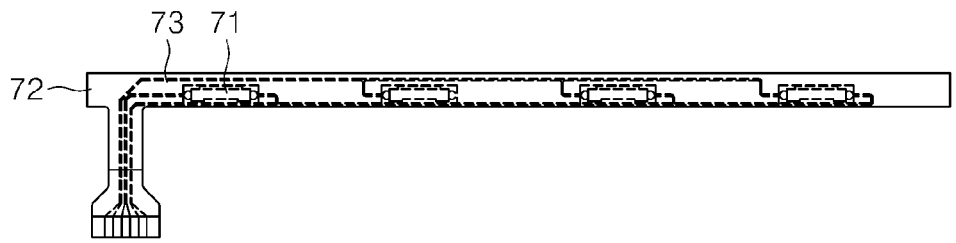
FIG. 3 is a plan view illustrating a light source of the LCD device according to the exemplary embodiment of the present invention shown in FIG. 1.

FIG. 1 is an exploded perspective view of a liquid crystal display ("LCD") device according to an exemplary embodiment of the present invention, FIGS. 2A and 2B are cross-sectional views taken along line I-I' of FIG. 1, and FIG. 3 is a plan view showing a light source of the LCD device according to the exemplary embodiment of the present invention shown in FIG. 1.

Referring to FIGS. 1 to 3, the LCD device includes an LCD panel 10, a driver 20, a backlight unit 90, a lower receiving member 110 and a mold frame 100.

The LCD panel 10 includes a thin film transistor ("TFT") substrate 11, a color filter substrate 12 and a liquid crystal layer (not shown) disposed between the TFT substrate 11 and the color filter substrate 12. A TFT array (not shown) is arranged on the TFT substrate 11, and a color filter array (not shown) is arranged on the color filter substrate 12.

The LCD panel 10 includes a liquid crystal cell (not shown) which is driven by a TFT (not shown). The TFT is arranged in a pixel area, and a gate line (not shown) and a data line (not shown) intersect each other near the pixel area. The LCD panel 10 supplies a pixel voltage from the data line to the liquid crystal cell, an liquid crystal molecules (not shown) are thereby driven, e.g., aligned, based on the pixel voltage in response to a scan signal, e.g., a gate driving signal, supplied from the gate line.

In an exemplary embodiment, the LCD panel 10 is supported by a panel supporter 102 of the mold frame 100. For example, an upper surface of the TFT substrate 11 may be supported by the panel supporter 102 of the mold frame 100 as shown in FIG. 2A. In an alternative exemplary embodiment, an upper surface of the color filter substrate 12 may be supported by the panel supporter 102 of the mold frame 100, as shown in FIG. 2B.

The driver 20 may include a gate driver (not shown) and a data driver (not shown). In an exemplary embodiment, the driver 20 is mounted on the LCD panel 10, as shown in FIGS. 1, 2A, and 2B. Alternatively, the driver 20 may be mounted on a circuit board 40 (FIG. 1) of the LCD device having the LCD panel 10.

The gate driver (not shown) sequentially supplies the gate driving signal to the gate line disposed on the LCD panel 10. The gate driving signal may include a gate on voltage and a gate off voltage, for example.

The data driver (not shown) supplies the pixel voltage to data line disposed on the LCD panel 10.

In operation, the driver 20 receives a pixel data signal and an initial driving voltage from the circuit board 40, which is electrically connected to an external component (not shown).

In an exemplary embodiment, the circuit board 40 is formed of a flexible material. Further, an electronic element 30 may be disposed on the circuit board 40.

In an exemplary embodiment, the electronic element 30 includes a timing controller (not shown) and a power supply (not shown). The timing controller supplies timing signals to both the gate driver and the data driver, and further supplies the pixel data signal to the data driver. The power supply supplies driving voltages to the gate driver, the data driver, and the LCD panel 10. The driving voltage includes, for example, the gate on voltage, the gate off voltage, an analogue driving voltage and a common voltage, but alternative exemplary embodiments are not limited thereto.

The backlight unit 90 supplies light to the LCD panel 10. In an exemplary embodiment, the backlight unit 90 includes one of an edge-type backlight unit and direct-type backlight unit. The edge-type backlight unit emits light toward a peripheral edge of the LCD panel. The direct-type backlight unit emits light toward a lower surface of the LCD panel as viewed in FIGS. 1, 2A and 2B. For purposes of explanation herein, the backlight unit 90 will be described as an edge-type backlight unit, but alternative exemplary embodiments of the present invention are not limited thereto.

The backlight unit 90 includes a light source 70, a light guide plate 50, a reflective sheet 60 and an optical sheet 80.

The light source 70 includes a light source substrate 72 and a light emitting diode ("LED") 71, as shown in FIGS. 2A, 2B and 3.

The LED 71 is disposed proximate to a peripheral side of the light guide plate 50, as shown in FIG. 3, to supply light to the light guide plate 50.

In an exemplary embodiment, a plurality of LEDs 71 may be disposed on the light source substrate 72. In addition, a plurality of signal lines 73 may be disposed on the light source substrate 72 to supply driving signals from an external component (not shown) to LEDs 71 of the plurality of LEDs 71. The light source plate 72 may include a heat sink (not shown) which radiates heat generated from the LEDs 71 away from the light source plate 72 and/or the LEDs 71. The circuit board 72 is formed of a flexible material, for example, but alternative exemplary embodiments are not limited thereto.

The LEDs 71 of the light source 70 are disposed at a predetermined distance from the light guide plate 50. As a result, problems such as a bright line, for example, caused by an improper distance between the light guide plate 50 and LED 71, are substantially reduced and/or effectively prevented.

The light source 70 may overlap a portion of the circuit board 40 such that the circuit board 40 prevents light generated in the light source 70 from leaking out of the LCD panel 10.

The light guide plate 50 directs light from the LED 71 to the LCD panel 10. The light guide plate 50 is disposed under the LCD panel 10 as shown in FIGS. 1, 2A and 2B. In an alternative exemplary embodiment, the light guide plate 50 may include prism lines (not shown) on an upper side and/or or a lower side thereof. The prism lines increase a light collection efficiency and therefore reduce a number of optical sheets 80 required in the LCD device.

The reflective sheet 60 reflects the light supplied from the light source 70 to the light guide plate 50 to improve a light-use efficiency of the light source 70.

The optical sheet 80 includes a protection sheet 81, a prism sheet 82 disposed on the protection sheet 81, and a diffusion sheet 83 disposed on the prism sheet 82, but alternative exemplary embodiments are not limited thereto.

The diffusion sheet 83 diffuses light supplied from the light guide plate 50 to reduce and/or effectively prevent bright lines and/or dark lines in the LCD device according to an exemplary embodiment of the present invention.

The prism sheet 82 increases a directivity of the light diffused by the diffusion sheet 83, effectively increasing a brightness of the light to be supplied to the LCD panel 10. In an alternative exemplary embodiment, a plurality of prism sheets 82 is provided.

The protective sheet 81 protects the prism sheet 82 from damages such as scratches, for example. The protective sheet 81 also prevents formation of static electricity between the LCD panel 10 and the prism sheet 82.

In an exemplary embodiment, the optical sheet 80 includes at least one protrusion. Specifically, the protective sheet 81, the prism sheet 82 and the diffusion sheet 83, include at least one protrusion 84a, 84b and 84c, respectively, as shown in FIG. 1. More specifically, the protective sheet 81 includes a first protrusion 84a, the prism sheet 82 includes a second protrusion 84b and the diffusion sheet 83 includes a third protrusion 84c. The first protrusion 84a, the second protrusion 84b and the third protrusion 84c may be disposed to overlap each other, as shown in FIG. 1, but alternative exemplary embodiments are not limited thereto.

The lower receiving member 110 receives the LCD panel 10 and the backlight unit 90 therein. In an exemplary embodiment, the lower receiving unit 110 is formed of a metal, for example, to protect the LCD panel 10 and backlight unit 90 from damage from external impact, for example.

The lower receiving member 110 may further include a connection aperture 111 to hold the mold frame 100 in the lower receiving member 110. More specifically, a hook 105 (FIG. 5) protrudes from the mold frame 100 and is inserted through the connection aperture 111. More specifically, connection apertures 111 of a plurality of connection apertures 111 are spaced from each other by a predetermined distance to coincide with locations of hooks 105 of a plurality of hooks 105. Since an exemplary embodiment of the present invention utilizes the connection apertures 111 and the hooks 105, other connection members such as bolts, for example, are not required. As a result a cost and a time required for assembling the components is substantially reduced.

The lower receiving member 110 may further include a notch 120 formed in a substantially rectilinear shape at a peripheral edge of the lower receiving member 110, as shown in FIG. 1. A portion of the light source substrate 72 extends through the notch 120 to connect to an external device (not shown).

The LCD device may further include an attaching sheet 130 for fixing the LCD panel 10 to the backlight unit 90 and/or the optical sheet 80, as shown in FIGS. 2A and 2B.

More specifically, a first side of the attaching sheet 130 is attached to a periphery of a lower surface (as viewed in FIGS. 1, 2A and 2B) of the LCD panel 10, while a second side, opposite to the first side, of the attaching sheet 130 is attached to the optical sheet 80, and even more specifically, to any one of the protective sheet 81, the prism sheet 82 and/or diffusion sheet 83, but alternative exemplary embodiments of the present invention are not limited thereto. For example, the attaching sheet 130 could be attached to the prism sheet 82 or the diffusion sheet 83. The attaching sheet 130 may holds the LCD panel 10 to the protective sheet 81, for example, to effectively prevent the LCD panel 10 from moving, e.g., sliding with an area created between the optical sheet 80 and the TFT substrate 11.

In addition, the attaching sheet 130 may be attached to the light source 70, as shown in FIGS. 2A and 2B, thereby preventing the light source 70 from moving.

Figure 4:
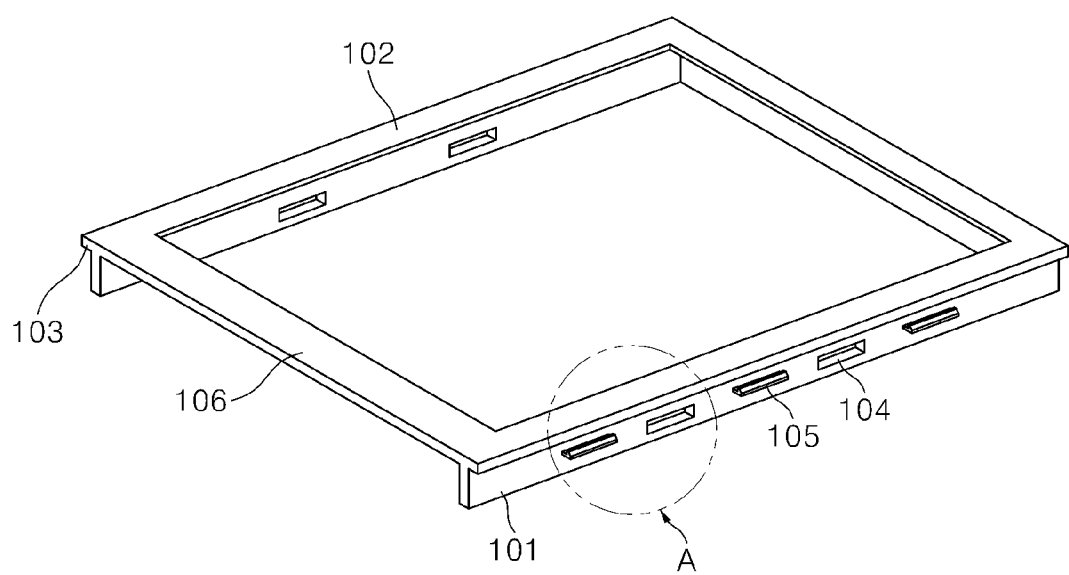
FIG. 4 is a perspective view illustrating a mold frame of the LCD device according to the exemplary embodiment of the present invention shown in FIG. 1.
Figure 5:
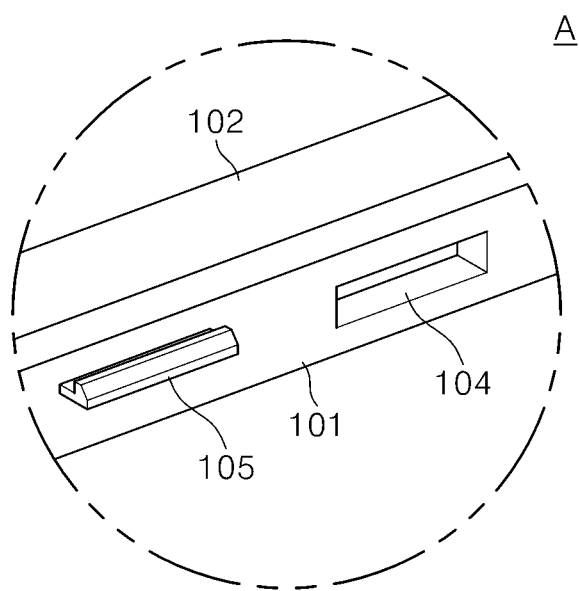
FIG. 5 is an enlarged perspective view of area "A" of FIG. 4.

FIG. 4 is a perspective view showing a mold frame of the LCD device according to the exemplary embodiment of the present invention shown in FIG. 1. FIG. 5 is an enlarged perspective view of area "A" of FIG. 4.

Referring to FIGS. 4 and 5, the mold frame 100 includes a side wall 101, a panel supporter 102 and a light leakage prevention portion 106.

The side wall 101 engages an inner wall of the lower receiving member 110 (FIG. 1). In an exemplary embodiment, the side wall 101 is thin compared to other side walls of the mold frame 100, or alternatively, the side wall 101 may be omitted. Further, the side wall 101 may have a constant thickness, or a thickness thereof may decrease, e.g., taper, as the side wall 101 extends away from the mold frame 100.

The light source 70 is disposed proximate to the mold frame 100.

The panel supporter 102 extends inward from the side wall 101 toward a central portion of the mold frame 100 to support the LCD panel 10 at an upper surface thereof (best shown in FIGS. 2A and 2B). More specifically, the panel supporter 102 may cover a peripheral portion of an upper surface of the TFT substrate 11 (FIG. 2A) or an upper surface of the color filter substrate 12 (FIG. 2B).

Referring to FIG. 4, the light leakage prevention portion 106 extends substantially from an end of a first supporter 102 an end of a second panel supporter 102 facing, e.g., disposed opposite to, the first panel supporter 102. The light leakage prevention portion 106 covers an area wherein the light source 70 is disposed in the lower receiving member 110, and prevents leakage of light from the light source 70 to outside the LCD device. In an alternative exemplary embodiment, the light leakage prevention portion 106 may be formed to cover and/or contact an upper side of the circuit board 40 (FIG. 1).

In addition, the light leakage prevention portion 106 may provide further, e.g., indirect, support for the LCD panel 10.

In yet another exemplary embodiment of the present invention, the light leakage prevention portion 106 may also be formed to substantially overlap the driver 20 (FIG. 1). In addition, the light leakage prevention portion 106 may be formed to have a thinner thickness than a thickness of the panel supporter 102, so that the circuit board 40 may be disposed under the light leakage prevention portion 106.

Referring again to FIGS. 2A, 2B and 4, the mold frame 100 may further include an extending portion 103. The extending portion 103 may extend outward from the side wall 101 of the mold frame 100, e.g., away from the central portion of the mold frame 100. The extending portion 103 is received by the lower receiving member 110 to protect the LCD panel 10, optical sheet 80, and light source 70 from damage from external impact, for example.

Referring to FIGS. 4 and 5, the side wall 101 may further include a plurality of fixing holes 104 through which the first protrusion 84a, the second protrusion 84b and the third protrusion 84c pass.

The side wall 101 includes the plurality of hooks 105 which are inserted and locked in the connection apertures 111 of the lower receiving member 110, as described above in greater detail. The hooks 105 may extend outward from the side wall 101, as shown in FIGS. 4 and 5.

Thus, the LCD device according to exemplary embodiments of the present invention effectively prevents the LCD panel 10 from separating from other components of the LCD device, even though the LCD device does not include a top chassis, because the mold frame 100 covers and supports the LCD panel 10, as described above in further detail with reference to FIGS. 1 to 5.

Figure 6:
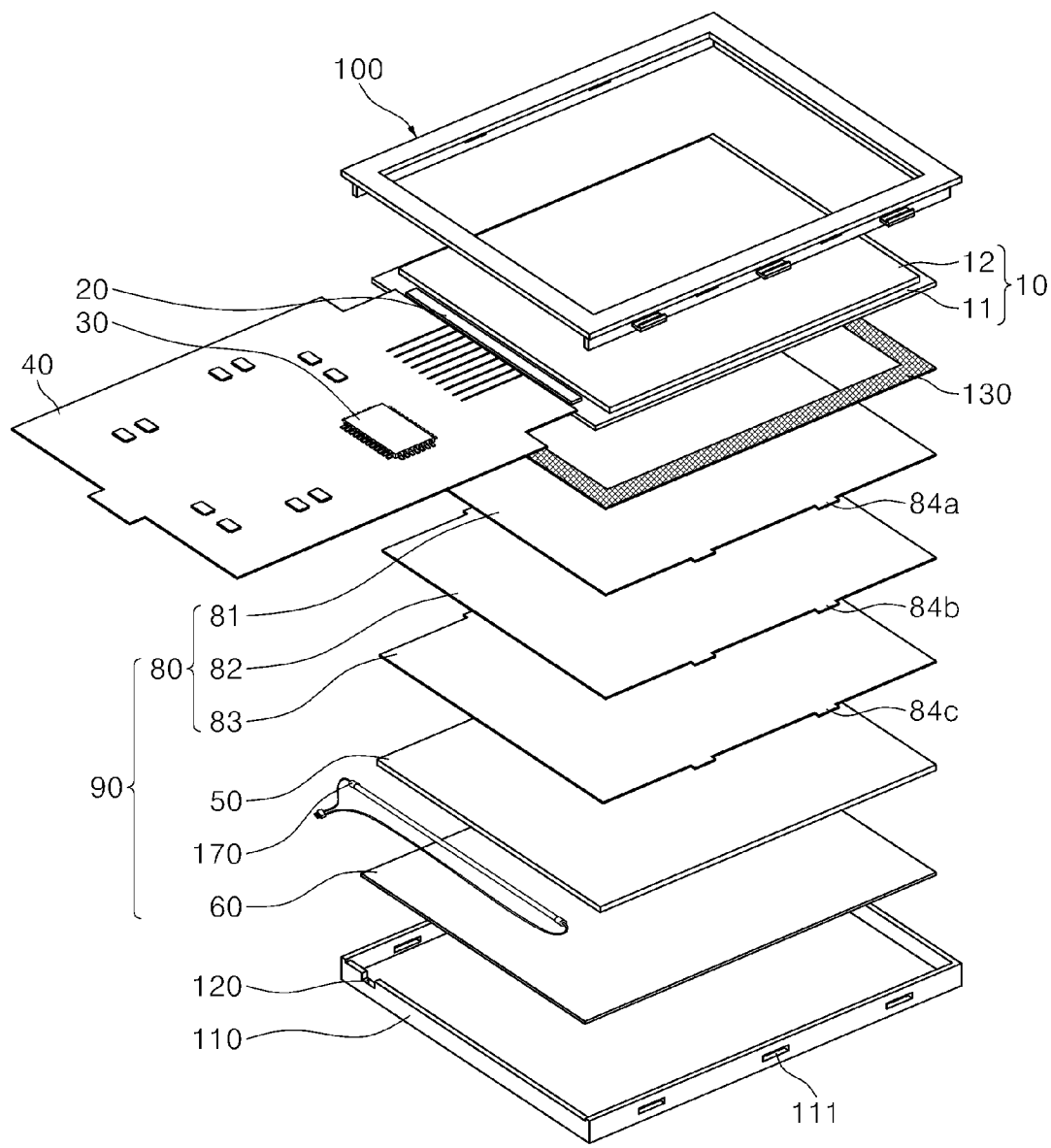
FIG. 6 is an exploded perspective view of an LCD device according to an alternative exemplary embodiment of the present invention.

FIG. 6 is an exploded perspective view of an LCD device according to an alternative exemplary embodiment of the present invention. The same labels of FIG. 1 indicate the same or like components of FIG. 6, and any repetitive detailed description thereof has been omitted.

Referring to FIG. 6, the light source 70 of an LCD device according to an alternative exemplary embodiment is a fluorescent lamp 170.

The fluorescent lamp 170 is a cold cathode fluorescent lamp ("CCFL") or, alternatively, a hot cathode fluorescent lamp ("HCFL"). Further, the fluorescent lamp 170 is disposed near a peripheral portion of the light guide plate 50, for example, as shown in FIG. 6. A lamp cover (not shown) may be disposed to cover a portion of the fluorescent lamp 170.

The CCFL may include a discharge tube, a fluorescent substance disposed in the discharge tube, a mixed gas injected in the discharge tube and lamp electrodes disposed near opposite ends of the discharge tube.

In operation of the CCFL, ultraviolet rays generated when negative ions collide with the mixed gas excite the fluorescent substance to radiate visible light.

In contrast, the HCFL generates a heating current in a filament electrode. The filament electrode is coated with a material which has a low work function, such as barium (Ba), for example, to facilitate emission of electrons, e.g., heat electrons. In the HCFL, the filament electrode is heated by applying the heating current, and the heat electrons are thereby emitted from the filament electrode. The heat electrons flow to a negative electrode and collide with a buffer gas, such as argon (Ar), and a main discharge gas, such as mercury gas (Hg), for example to radiate ultraviolet rays. The ultraviolet rays excite a fluorescent substance to emit visible light.

Figure 7:
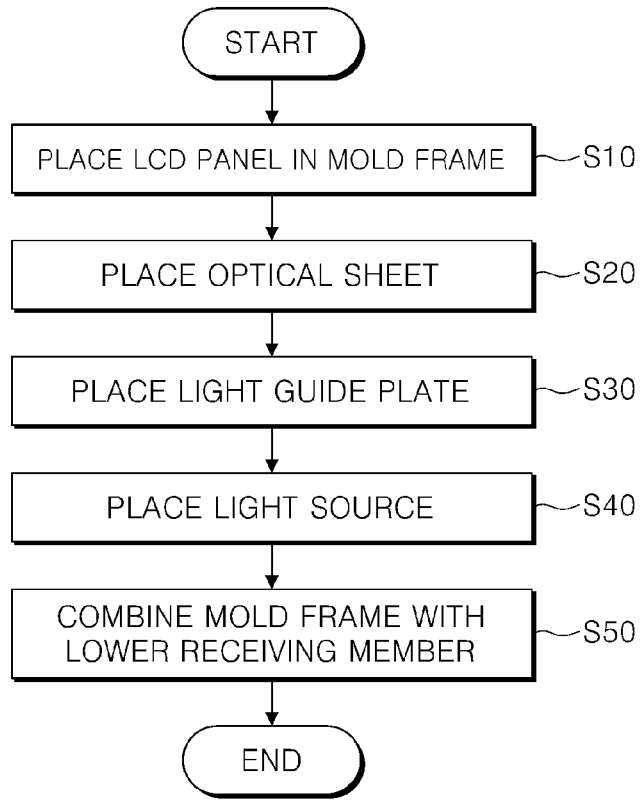
FIG. 7 is a flow chart illustrating steps of a method of assembling an LCD device according to an exemplary embodiment of the present invention.

FIG. 7 is a flow chart illustrating steps of a method of assembling an LCD device according to an exemplary embodiment of the present invention, and FIGS. 8A to 8E are exploded perspective views illustrating sequential steps of assembling an LCD device using the method according to the exemplary embodiment of the present invention shown in FIG. 7.

The method of assembling the LCD device includes placing the LCD panel 10 in the mold frame 100 (S10), placing the optical sheet 80 under the LCD panel 10 (S20), placing the light guide plate 50 under the optical sheet 80 (S30), placing the light source 70 near a side of the light guide plate 50 (S40) and combining the lower receiving member 110 with the mold frame 100 (S50), as will now be described in further detail with reference to FIGS. 7 to 8E. The same reference numerals in FIGS. 1 to 5 represent the same or like components in FIGS. 7 to 8E, and any repetitive description thereof will hereinafter be omitted. For purposes of description hereinafter, it will be noted that the LCD device shown in FIGS. 7 to 8E has been inverted, e.g., is upside down, with respect to an orientation of the LCD device shown in FIGS. 1 to 5.

Figure 8A:
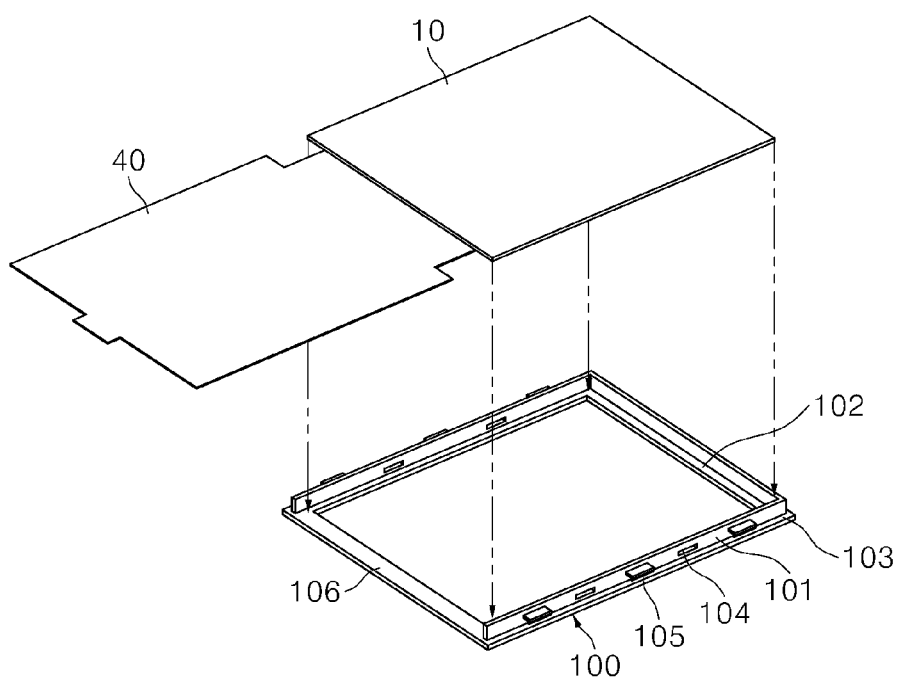
FIGS. 8A to 8E are exploded perspective views illustrating sequential steps of assembling an LCD device using the method according to the exemplary embodiment of the present invention shown in FIG. 7.
Figure 8B:
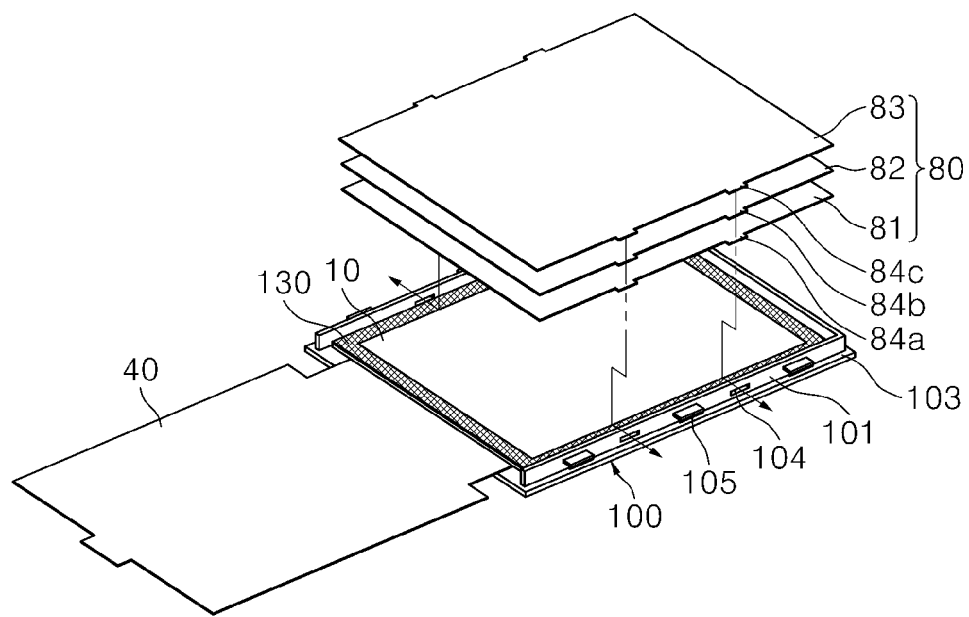

In step S10, an upper surface of the LCD panel 10 is disposed on the panel supporter 102 of the mold frame 100 to be supported by the panel supporter 102, as shown in FIG. 8A. More specifically, an upper surface of the TFT substrate 11 (FIG. 2A) or an upper surface of the color filter substrate 12 (FIG. 2B) is supported by the panel supporter 102.

In step S20, the optical sheet 80, e.g., the protective sheet 81, the prism sheet 82 and/or the diffusion sheet 83, is disposed under the LCD panel 10. More specifically and referring to FIG. 8B, in an exemplary embodiment, the protective sheet 81 is disposed on, e.g., under, the LCD panel 10, and the prism sheet 82 is then disposed on, e.g., under, the protective sheet 81. The diffusion sheet 83 is then disposed on, e.g., under, the prism sheet 82. Further, the optical sheet 80 is disposed proximate to the side wall 101 of the mold frame 100, and the LCD panel 10 is thereby seated on the optical sheet 80.

The step S20 may further include disposing the attaching sheet 130 to a periphery of the optical sheet 80 or, alternatively, to a periphery of the LCD panel 10. For example, a first surface of the attaching sheet 130 may be attached to the periphery of the LCD panel 10, and a second surface, opposite the first surface, may be attached to the periphery of the optical sheet 80. Alternatively, the first surface of the attaching sheet 130 may be attached to the periphery of the optical sheet 80, and the second surface of the attaching sheet 130 may be attached to the periphery of the LCD panel 10. In an exemplary embodiment, an adhesive material is applied to the first surface and/or the second surface of the attaching sheet 130. Thus, the attaching sheet is attached to the LCD panel 10 along each of four peripheral edges, e.g., the periphery, thereof.

The step S20 may further include inserting the first protrusion 83a, the second protrusion 84b and the third protrusion 84c into corresponding fixing holes 104. The insertion of the first protrusion 83a, the second protrusion 84b and the third protrusion 84c into the corresponding fixing holes 104 allows the optical sheet 80 to be locked, e.g., fixed, to the mold frame 100.

Figure 8C:
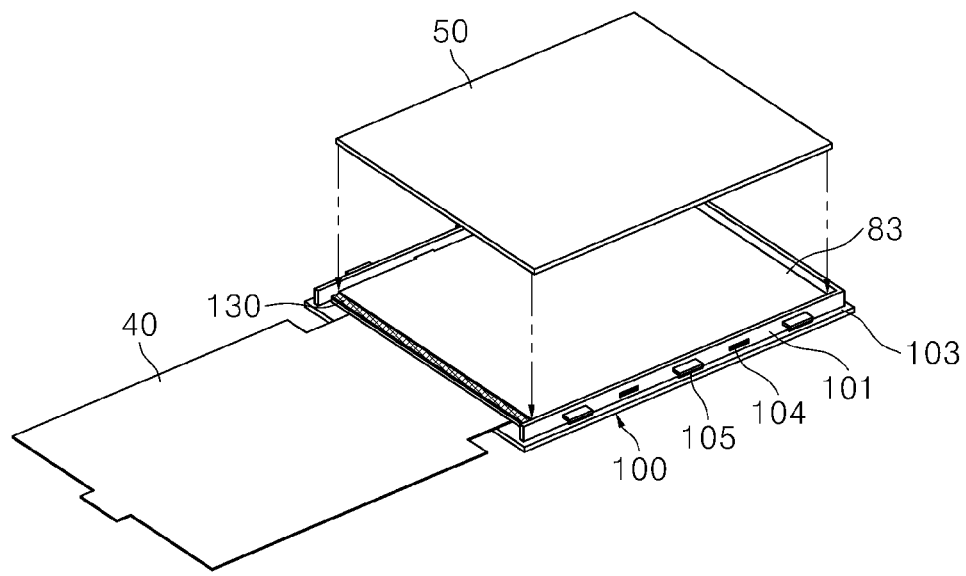

In step S30, the light guide plate 50 is disposed on, e.g., under, the diffusion sheet 83 as shown in FIG. 8C. An incident surface, e.g., a side of the light guide plate 50 which receives light, is aligned to be located proximate to an area of the mold frame 100 where the side wall 101 is not provided.

Figure 8D:
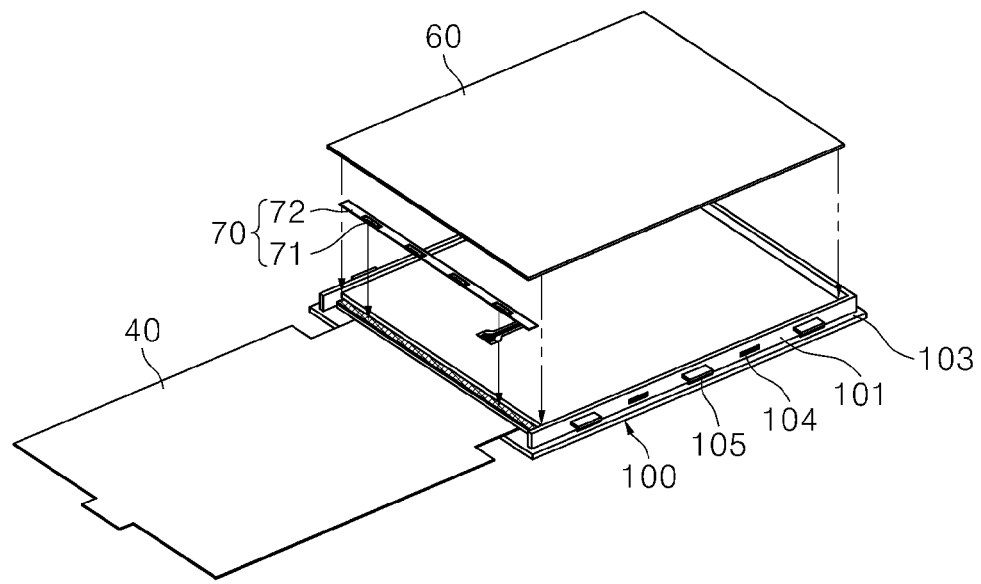
Figure 8E:
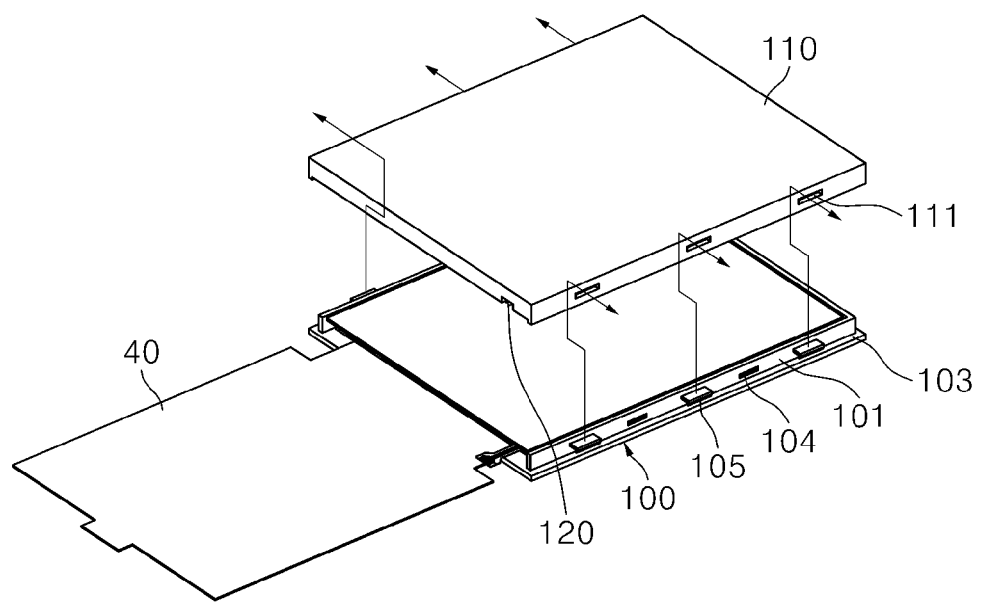

In step S40, the light source 70 is disposed proximate to the incident surface of the light guide plate 50 as shown in FIG. 8D. As described in greater above with reference to FIGS. 1 to 5, the LEDs 71 may be arranged to be spaced apart from the incident surface of the light guide plate 50 by a predetermined distance, thereby preventing deterioration of a display quality, such as by a bright line, for example. The light source substrate 72 of the light source 70 is disposed on the attaching sheet 130, thereby attaching the light source substrate 72 to the attaching sheet 130 using the adhesive material applied to the first surface and/or the second surface of the attaching sheet 130, as described above. Therefore, the light source substrate 72 is attached to the LCD panel 10 via the attaching sheet 130. The step S40 may further include disposing the reflective sheet 60 under the light guide plate 50. In an exemplary embodiment, reflective sheet 60 is disposed to cover the LEDs 71, as shown in FIG. FIG. 8D.

In an alternative exemplary embodiment, the step S30 may be performed after Step S40, e.g., the light guide plate 50 may be disposed under the diffusion sheet 83 after the light source 70 has been disposed proximate to the light guide plate 50.

In step S50, the lower receiving member 110 is combined with the mold frame 100 in which the LCD panel 10, the optical sheet 80, the light guide plate 50, the light source 70 and the reflective sheet 60 have been received. Specifically, the hooks 105 protruding from the mold frame 100 are inserted and locked into the connection apertures 111, and the mold frame 100 is thereby effectively held to the lower receiving member 110.

In an exemplary embodiment, the extending portion 103 is disposed on an upper surface of the lower receiving member 110. Thus, damage to the LCD panel 10, the backlight unit 90 and the panel supporter 102, which occurs when the lower receiving member 110 is combined with the mold frame 100, is effectively prevented. In an alternative exemplary embodiment, the extending portion 103 may be omitted.

According to exemplary embodiments of the present invention as described herein, an LCD panel is effectively prevented from coming off of a mold frame without use of a top chassis, resulting in an LCD device including the LCD panel having at least the advantages of being thinner and/or lighter.

The present invention should not be construed as being limited to the exemplary embodiments set forth herein. Rather, these exemplary embodiments are provided so that this disclosure will be thorough and complete and will fully convey the concept of the present invention to those skilled in the art.

While the present invention has been particularly shown and described with reference to exemplary embodiments thereof, it will be understood by those of ordinary skill in the art that various changes in form and details may be made therein without departing from the spirit or scope of the present invention as defined in the following claims.

What is claimed is:

1. A display device comprising:
a display panel having an upper substrate and a bottom substrate and configured to display an image;
a mold frame configured to receive the display panel, the mold frame comprising:
a first side wall surrounding an open portion of the mold frame;
a display panel supporter extending from an upper portion of the first side wall toward the open portion of the mold frame; and
a protrusion extending from the first side wall away from the open portion of the mold frame; and
a lower receiving member having a second side wall configured to receive the mold frame and the display panel, the second side wall of the lower receiving member comprising a fixing aperture,
wherein an outer side surface of the first side wall of the mold frame faces an inner side surface of the second side wall of the lower receiving member,
the display panel supporter of the mold frame covers a peripheral portion of an upper surface of the display panel to support the display panel, and
the protrusion of the mold frame is inserted into the fixing aperture of the second side of the lower receiving member.

2. The display device of claim 1, wherein a thickness of the first side wall of the mold frame is one of a uniform thickness and a non-uniform thickness which decreases as the first side wall extends toward a bottom surface of the lower receiving container.

3. The display device of claim 1, further comprising a light source disposed between the mold frame and the lower receiving member, wherein the mold frame further comprises a light leakage prevention portion disposed above the light source on a portion of the peripheral area of the mold frame.

4. The display device of claim 1, wherein the mold frame further comprises an extending portion which extends from the upper portion of the first side wall in a direction opposite to an extending direction of the display panel supporter to cover an upper surface of the second side wall of the lower receiving member.

5. The display device of claim 1, further comprising a backlight unit disposed between the lower receiving unit and the display panel, the backlight unit comprising:
a light source configured to generate light; and
a light guide plate disposed on the light source to direct the light from the light source to the display panel.

6. The display device of claim 5, wherein the light source comprises one of a cold cathode fluorescent lamp and a hot cathode fluorescent lamp.

7. The display device of claim 6, wherein the backlight unit further comprises at least one optical sheet configured to receive the light generated by the light source, the optical sheet comprising at least one of a protective sheet, a prism sheet and a diffusion sheet.

8. The display device of claim 7, further comprising:
a reflective sheet disposed on the light guide plate to reflect the light to the light guide plate.

9. The display device of claim 8, further comprising:
an attaching sheet disposed between the display panel and the optical sheet to attach the display panel to the optical sheet.

10. The display device of claim 5, wherein the light source comprises:
a light source substrate; and
a light emitting diode disposed on the light source substrate.

11. The display device of claim 10, further comprising:
an attaching sheet disposed between the light source substrate and the display panel to attach the light source substrate to the display panel.

12. The display device of claim 5, further comprising:
a driver configured to drive the display panel; and
a circuit board disposed above the light source on a peripheral side of the display panel, wherein the circuit board transmits a driving signal to the driver.

13. The display device of claim 1, wherein
the mold frame further comprises a hook extending from the first side wall away from the open portion of the mold frame,
the second side wall of the lower receiving member comprises a connection aperture, and
the hook of the mold frame is inserted into the connection aperture.

14. A method of assembling a display device comprising:
disposing a display panel in a mold frame, the mold frame comprising:
a first side wall surrounding an open portion of the mold frame;
a display panel supporter extending from an upper portion of the first side wall toward the open portion of the mold frame; and
an extending portion which extends outwardly from the first side wall away from the open portion of the mold frame to be disposed on an upper surface of a lower receiving member configured to receive the mold frame;
disposing an attaching member on a periphery of the display panel facing the lower receiving panel;
attaching the attaching member to the optical sheet;
disposing an optical sheet between the display panel and the light guide plate, the optical sheet comprising at least one of a protective sheet, a prism sheet and a diffusion sheet;
disposing a light guide plate on the display panel;
disposing a light source proximate to a side of the light guide plate; and
combining the mold frame with the lower receiving member,
wherein an outer surface of the first side wall of the mold frame faces an inner surface of a second side wall of the lower receiving member, and the display panel supporter of the mold frame covers a peripheral portion of an upper surface of the display panel to support the display panel.

15. The method of claim 14, wherein said disposing the optical sheet comprises inserting a protrusion disposed on the optical sheet into a corresponding fixing aperture disposed in the first side wall of the mold frame.

16. The method of claim 14, further comprising:
disposing an attaching member on a periphery of the display panel facing the lower receiving panel;
attaching the attaching member to the light guide plate; and
attaching the attaching member to the light source,
after said disposing the display panel in the mold frame.

17. The method of claim 14, wherein said combining the mold frame with the lower receiving member comprises inserting a hook which protrudes from the first side wall of the mold frame into a connection aperture disposed in the lower receiving member.

* * * * *